INVENTOR.
GEORGE A. FREIERMUTH
BY Ralph L. Dugger
ATTORNEY

United States Patent Office 2,886,312
Patented May 12, 1959

2,886,312

VEHICLE CONSTRUCTION

George Albert Freiermuth, Hastings, Minn.

Application August 12, 1957, Serial No. 677,662

5 Claims. (Cl. 267—20)

This invention relates to vehicle construction and particularly to an improvement in the spring mounting of wheels of vehicles. The invention has particular application in respect to the front end construction of automotive type vehicles and in that case the wheels are usually made steerable, but the invention may also be used for suspending the rear wheels of automotive and other vehicles and in which event the wheels are not usually made steerable.

It is an object of the invention to provide an improved wheel suspension for a vehicle, and more particularly to provide improvements whereby the wheels may be mounted on the vehicle for movement relative thereto and well cushioned by springs. It is an object of the invention to provide an improved wheel spring mounting wherein the springs are protected by the construction of the frame of the vehicle. It is a further object of the invention to provide an improved wheel mounting and spring suspension allowing the use of coil springs. It is a further object of the invention to provide an improved form of wheel suspension for vehicles utilizing springs of different compressibility and rates of compression.

It is another object of the invention to provide an improved wheel suspension wherein the springs and shock absorbers may be protected within the framing of the vehicle.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 1:
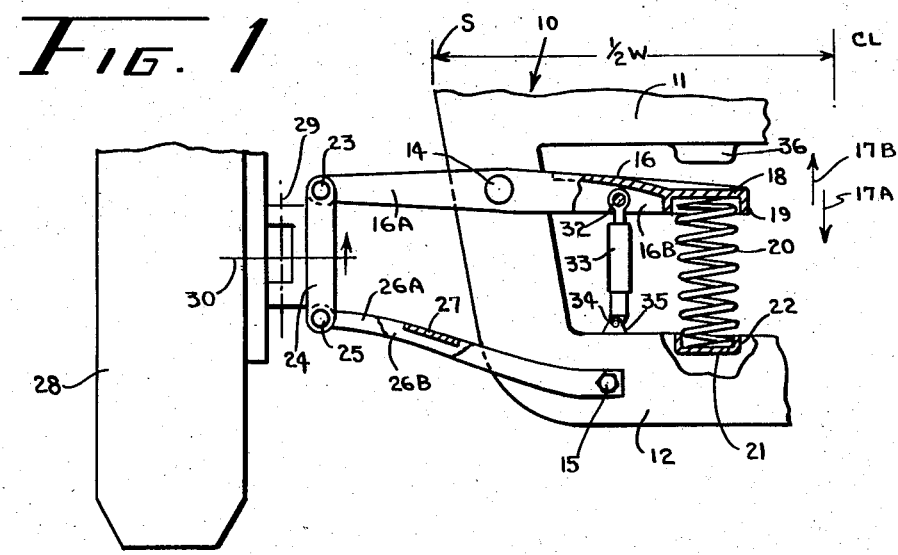
Figure 2:
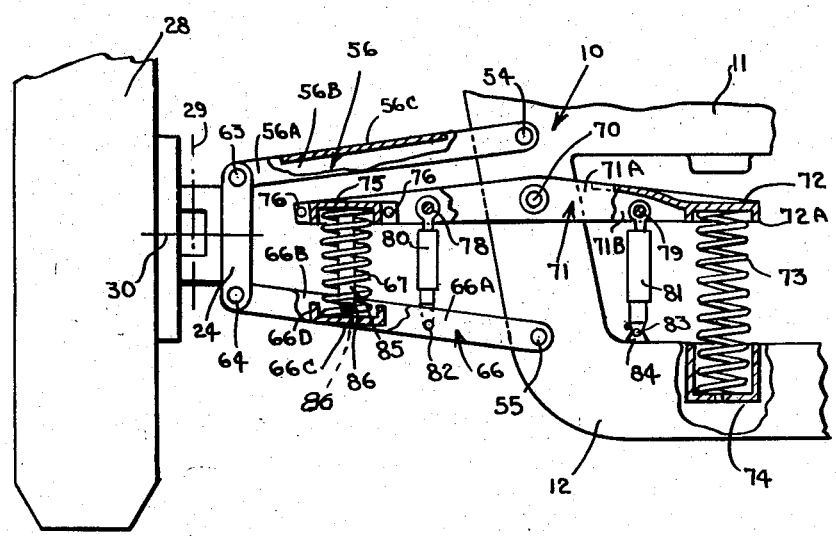

The invention is illustrated with reference to the drawings wherein Figure 1 is a fragmentary front elevational view of a principal form of the present invention. Figure 2 is a fragmentary front elevational view partly broken away of another form of the invention.

Figure 1 illustrates generally a portion of a vehicle frame and 11 and 12 are cross frame members arranged one above the other. These frame members may be either at the front or the rear of the vehicle. The cross frame member 12 has an upwardly extending portion which joins with portion 11 to constitute a cross frame assembly of the vehicle frame. The members 11 and 12 are generally parallel and are preferably box sections. In member 12, and slightly below the level of member 11 there is provided a through pivot 14 and at a lower elevation in the portion 12 there is provided another through pivot 15. These pivots extend in a direction which is generally in the direction of movement of the vehicle when it is going straight and the ends of pivot 14 project beyond the thickness of the box section frame element 12—13. Each of the pivots 14 and 15 which are preferably bolts set in a tubular bearing within the frame, extends lengthwise of the vehicle frame and extends in the direction of movement of the vehicle when it is moving along in a straight path. Upon the pivot 14 are placed a pair of arms 16A—16B as shown in Figure 1. These arms are of identical shape and the rear arm 16B is pivoted on the rear end of pivot bolt 14 and the front arm 16A is pivoted on the front end of bolt 14. The portion of the arms 16A and 16B which are to the right of pivot 14 in Figure 1, are fastened together by a web 18 and hence arms 16A and 16B operate as a unit and are pivoted at 14 for movement as shown by arrows 17A and 17B.

Plate 18 has a downwardly extending flange 19 thereon forming a circular rest in which the upper end of coil spring 20 is seated and held. The plate 18 is essentially a web which extends from the front arm 16A to the rear arm 16B and hence fastens the two together. The two arms are hence a single unit tied together by the web 18, which also, due to the locating flange 19, serves to form a seat or pocket into which the upper end of the spring 20 is adapted to be received. A similar web 21 having a circular flange 22 on it is recessed into the upper surface of the box frame portion 12, and the lower end of the spring 20 is adapted to be received in such recess. The normal action of the spring 20 is to push the web 18, and hence the right hand end of the arms 16A—16B in an upward direction. The opposite ends of the arms 16A—16B (left of the pivot, in Figure 1) are not connected together and they may be slipped onto the frame for assembly with bolt 14. The left ends of arms 16A and 16B are provided with a through pivot 23 upon which is pivotally fastened the upper end of a mounting plate 24, the lower portion of the plate being provided with another through pivot 25. To the pivot 25 there is attached a pair of arms 26A—26B, which are fastened together by a web plate 27. The two arms 26A—26B operate as a unit and constitute the stabilizing arms whereas arms 16A—16B are the load carrying arms. The web plate 27 merely serves to hold the two arms together and the right ends of these arms extend along the front and back surfaces of the frame members 12 so as neatly to embrace the cross frame member. A bolt 15 is of course provided with a suitable bearing in frame member 12. The right end of the arms 26—26A, are pivoted to the cross frame member 12 by means of the through pivot bolt 15.

From this construction it will be evident that when the mounting device 24 for the wheel 28, moves in an upward direction as indicated by the arrow 29, the arms 16A—16B and the arms 26A—26B will be rotated in a clockwise direction so as to push the right hand end of the arm 16 downwardly in the direction of arrows 17A. This tends to compress the spring 20 and hence the spring 20 establishes the position of the arm 16, depending upon the load of the vehicle, and upon the instantaneous loads applied to the wheel 28 as it is moving over roughness in the roadway. The mounting plate 24 serves to support a wheel spindle shaft, not illustrated, upon which the wheel 28 is mounted for rotation. In the event that the wheel 28 is intended for a steering wheel, the spindle shaft is mounted by means of a spindle bearing along the axis 29 as is well known, and when the wheel 28 is intended not to steer, the spindle shaft, not illustrated, is connected directly to the member 24. The axis of the wheel is, in either case along line 30. At the right end of the arms 16A—16B there is another pivot 32, which is located between the position of pivot 14, and the seat 19 for spring 20, the pivot 32 being simply a pivot pin extending entirely through the two arms 16A—16B. Upon this pin there is connected the upper end of a shock absorber 33, the lower end of which is pivoted at 34 upon the perch 35 on the cross frame member 12. Accordingly as the vehicle suspension arm 16 moves upwardly as shown by arrow 17B or downwardly in the direction of arrow 17A, the rate of movement of the arm 16 is controlled by the shock absorber 33 but the spring suspension load is entirely carried by the coil spring 20.

According to this invention, the position of the coil spring is well within the width of the vehicle frame, which extends generally from the side line S through the dimension ½ W to the center line CL and therefore the spring 20 and the shock absorber 33 are protected. If desired shields, not shown, may be fastened against the front and back faces of cross frame members 11 and 12 so as to afford further protection for the spring and shock absorber mechanism. Such additional shields are, of course, shaped to permit the active member 16A—16B to work therethrough.

On the underside of the upper cross frame member there is provided a bumper 36 of rubber or other resilient material. This is so located as to be in the path of movement of the web 18 when the arms 16A—16B move upwardly in the direction of arrows 17B. The bumper 36 limits the upward movement during rebound.

Referring to Figure 2, the construction of the cross frame members 11 and 12 is generally the same and are of box construction. However in this instance the upper pivot bearing 14 is replaced by a pivot bearing 54 and the lower pivot bearing 15 is replaced by pivot bearing 55. The upper arm 56 can be in the form of two arm portions 56A and 56B which are connected together by an integral web 56C. The web 56C does not extend entirely from end to end and hence the two arm portions 56A and 56B form bifurcated ends which embrace the front and rear surfaces of the frame member 10 at the right end at pivot 54. Pivot 54 passes through an aperture in each of the bifurcated ends which are accordingly pivoted to the frame. Similarly the opposite end of the arm left, as shown in Figure 2, is provided with a pivot at 63 to which is attached the mounting plate 24 upon which the wheel spindle is mounted.

Similarly the lower arm generally designated 66 is composed of a front portion 66A and a rear portion 66B which are fastened together as a unit by a web 66C and the latter is provided with a circular flange 66D thereon, which serves as a location for the bottom of a spring 67. The right end of the arm 66 is likewise bifurcated and is attached by pivot bolt 55 to the cross frame 12 of the vehicle. At the opposite end of the arm 66 there is provided a pivot 64 which is pivotally attached to the lower portion of the mounting plate 24. Arm 66 is a load carrying arm and arm 56 is a stabilizing arm.

Intermediate the pivots 54 and 55 there is provided another pivot 70 upon which a load transfer rocker arm generally designated 71 is pivoted at 70. Arm 71 is composed of front and rear portions 71A and 71B. These portions 71A and 71B of the rocker arm are parallel to the front and rear faces of the box frame member 12 of the frame and embrace that portion of the frame. The right end of the arm 71A and 71B are fastened together by an integral cross web 72 which likewise is provided with a flange 72A of circular shape and extending downwardly. Flange 72A forms a seat for receiving and locating the upper end of the coil spring 73. In this instance the coil spring 73 extends down into a well 74 that is built into the cross frame member 12, so as to provide a greater depth of spring in the vertical direction.

In order to allow for assembly of the apparatus the left ends of the two arm members 71A and 71B are not attached together until after they have been slipped onto the frame 12 and the pivot 70 is placed. Then at the left end of the arms 71A and 71B there is inserted a connecting flange 75 which, at each end, front and rear, is provided with ears 76—76 that are bolted or otherwise attached to the inner faces of the arms 71A and 71B thereby firmly attaching the web 75 to both of these arms at the left. The entire assembly then operates as one unit. The web 75, is likewise provided with a downwardly extending flange of circular shape, into which the upper end of the spring 67 is adapted to be received and located.

Between the two arms 71A and 71B there extends pivot bolts 78 and 79 which receive the upper ends of the shock absorber units 80 and 81 respectively. The lower end of the shock absorber units 80 is pivotally connected by the pivot bolt 82 which extends through the two sections of the arm 66 and the lower end of the shock absorber 81 is pivotally connected at 83 to a perch 84 on the cross frame member 12. According to the construction shown in Figure 2, the wheel spindle (not shown) upon which the wheel 28 is mounted is attached along the axis 30 to the mounting plate 24 and if the wheel is not to be steerable, the spindle shaft is solidly attached to the plate 24. However, if the wheel 28 is to be steerable the spindle shaft is pivoted upon the mounting plate 24 so as to be steerable about axis 29, as mentioned with reference to Figure 1. Of course in respect to each of the constructions shown in Figures 1 and 2 where the wheel is made steerable, the spindle shaft is arranged with proper bracketing and connections so that its position may be determined by a suitable steering mechanism.

In the form shown in Figure 2 the springs 67 and 73 may be proportioned so that they accept load at different rates and the shock absorbers 80 and 81 are so correlated with respect to the springs that the rate of absorption of energy by the shock absorbers 80 and 81 is different. Thus the spring 67 may be a light spring so that during movement of the wheel over ordinary or slight undulations, the rocker arm 71 will not be appreciably moved, and in such instance the springs 67 will do most of the springing of the vehicle. However, when heavier loads are encountered and the terrain is rougher, the arm 71 will be moved, thus compressing the springs 73. In order that the spring 67 may be provided with a limit of motion I prefer to insert a tubular support 85 within the spring 67. This tubular support 85 is preferably fastened to the web 75 and the tube extends down to a certain distance above web 66C. Then within tube 85 there is provided a length of resilient material such as rubber 86 to provide a resilient stop which limits the compression of spring 85. Accordingly when the vehicle is loaded so that bumper 85—86 strikes web 66C, the spring 73 is then compressed and forms substantially the resilient support of the vehicle.

As many widely apparently different embodiments of this invention may be made without departing from the spirit and scope thereof, it is to be understood that I do not limit myself to the specific embodiments herein.

What I claim is:

1. A vehicle wheel spring suspension comprising upper, middle and lower pivots on the vehicle frame said pivots being generally parallel and extending generally in the direction of movement of the vehicle, a load carrying arm pivotally connected to the lower pivot and extending outwardly beyond the side of the vehicle frame and in a direction generally transverse the direction of motion of the vehicle frame, a stabilizing arm pivotally connected to the upper pivot and extending outwardly in respect to the width of the vehicle frame and generally transversely the direction of movement of the vehicle and in a position generally above the load carrying arm, said load carrying arm and stabilizing arm being provided at their outer ends with pivots, a wheel carrying bracket plate pivotally connected to the pivots at the outer ends of said arms, a load transfer arm having its central portion pivoted on the middle pivot and extending generally transversely the direction of movement of the vehicle from a position outside the width the vehicle frame to a position within the width of said frame, said load transfer arm being located at an elevation between said load carrying arm and said stabilizing arm, a compression spring mounted upon the load carrying arm and extending to and against the outwardly extending portion of the load transfer arm, and another compression spring mounted between the frame and that portion of the load transfer arm which is within the width of the vehicle frame.

2. The apparatus of claim 1 further characterized in that a shock absorber is pivotally connected between the load transfer arm and the load carrying arm.

3. The apparatus of claim 1 further characterized in that a shock absorber is connected between the vehicle frame and said load transfer arm.

4. The apparatus of claim 1 further characterized in that a movement limiting resilient bumper is provided between the load carrying arm and the load transfer arm and connected to one of said arms for limiting the movement of the said arms toward each other.

5. The apparatus of claim 1 further characterized in that said springs have different loading rates.

References Cited in the file of this patent

UNITED STATES PATENTS

| | | |
|---|---|---|
| 1,681,885 | Raab | Aug. 21, 1928 |
| 2,260,634 | Mullner | Oct. 28, 1941 |
| 2,347,948 | Hassett | May 2, 1944 |
| 2,512,057 | Fowler | June 20, 1950 |
| 2,559,239 | Watson | July 3, 1951 |
| 2,657,070 | Kallner | Oct. 27, 1953 |

FOREIGN PATENTS

| | | |
|---|---|---|
| 481,921 | Italy | June 17, 1953 |